United States Patent
Chen et al.

(10) Patent No.: US 11,483,825 B2
(45) Date of Patent: Oct. 25, 2022

(54) METHOD AND DEVICE FOR CANCELING UPLINK TRANSMISSION

(71) Applicant: VIVO MOBILE COMMUNICATION CO., LTD., Guangdong (CN)

(72) Inventors: Xiaohang Chen, Chang'an Dongguan (CN); Zhi Lu, Chang'an Dongguan (CN); Xueming Pan, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/040,831

(22) PCT Filed: Mar. 11, 2019

(86) PCT No.: PCT/CN2019/077649
§ 371 (c)(1),
(2) Date: Sep. 23, 2020

(87) PCT Pub. No.: WO2019/184688
PCT Pub. Date: Oct. 3, 2019

(65) Prior Publication Data
US 2021/0022134 A1    Jan. 21, 2021

(30) Foreign Application Priority Data
Mar. 26, 2018    (CN) .......................... 201810254010.6

(51) Int. Cl.
*H04W 72/04*    (2009.01)
*H04L 5/00*    (2006.01)
*H04W 72/12*    (2009.01)

(52) U.S. Cl.
CPC ....... *H04W 72/0446* (2013.01); *H04L 5/0053* (2013.01)

(58) Field of Classification Search
CPC ......... H04W 72/0446; H04W 72/1289; H04W 72/0413; H04L 5/0078; H04L 5/0053
See application file for complete search history.

(56) References Cited

U.S. PATENT DOCUMENTS 8,839,362 B2 * 9/2014 Jung ..................... H04L 63/04
726/2
10,856,174 B2 * 12/2020 Babaei .............. H04W 72/1284
(Continued)

FOREIGN PATENT DOCUMENTS

CN    107295674 A    10/2017
CN    110149716    *  2/2018  ............ H04W 72/04
(Continued)

OTHER PUBLICATIONS

Written Opinion and International Search Report in Application No. PCT/CN2019/077649 dated Oct. 8, 2020.
(Continued)

*Primary Examiner* — Diane L Lo
*Assistant Examiner* — Abusayeed M Haque
(74) *Attorney, Agent, or Firm* — Maschoff Brennan

(57) ABSTRACT

A method and a device for canceling an uplink transmission are provided. The method includes: when receiving an uplink transmission cancelation indication, determining a first starting time, where the first starting time is a starting time of a reference time region; and determining, based on the first starting time, a target time region for canceling the uplink transmission.

20 Claims, 7 Drawing Sheets

(56) References Cited

U.S. PATENT DOCUMENTS

| | | | | |
|---|---|---|---|---|
| 2004/0120288 | A1* | 6/2004 | Adjakple | H04W 24/00 370/333 |
| 2018/0270699 | A1* | 9/2018 | Babaei | H04W 28/0278 |
| 2018/0270791 | A1* | 9/2018 | Park | H04W 68/025 |
| 2018/0279229 | A1* | 9/2018 | Dinan | H04W 52/146 |
| 2019/0090218 | A1* | 3/2019 | Noh | H04W 88/06 |

FOREIGN PATENT DOCUMENTS

| | | |
|---|---|---|
| WO | 2017/194822 A1 | 11/2017 |
| WO | 2018/019085 A1 | 2/2018 |
| WO | 2018/026991 A1 | 2/2018 |

OTHER PUBLICATIONS

"Remaining issues on multiplexing data with different transmission durations", 3GPP TSG RAN WG1 Meeting 91, Nov. 27, 2017.

CN Office Action in Application No. 201810254010.6 dated Apr. 6, 2021.

CN Office Action in Application No. 201810254010.6 dated Jun. 18, 2021.

EP Search Report in Application No. 19776580.3 dated Apr. 19, 2021.

"Multiplexing data with different transmission durations", 3PP TSG RAN WG1 Meeting AH 1801, R1-1800205, Jan. 22, 2018, vivo.

"Multiplexing of UL Transmissions with Different Reliability Requirements" 3GPP TSG RAN WG1 Meeting #92, R1-1802002, Feb. 26, 2018, Samsung.

"Remaining issues on group common PDCCH", 3GPP TSG RAN WG1 #92, R1-1802208, Feb. 26, 2018, LG Electtronics.

"Offkube discussion summary on remaining issues on GC-PDCCH carrying SFI", 3GPP TSG RAN WG1 #92, R1-1803498, Feb. 28, 2018, Qualcomm Incorporated.

JP Office Action in Application No. 2020-552034 dated Nov. 22, 2021.

"On multiplexing of data transmissions with different durations" 3GPP TSG RAN WG1 Meeting AH 1801, R1-1800261, CATT, Jan. 22, 2018.

"Discussion on handling UL multiplexing of transmissions with different reliability requirements" 3GPP TSG RAN WG1 Meeting #92, R1-1801550, vivo, Feb. 26, 2018.

"Considerations on UL pre-emption in NR" 3GPP TSG RAN WG1 Meeting #92, R1-1802063, Sony, Feb. 26, 2018.

"Discussion on multiplexing UL transmission with different requirements" 3GPP TSG RAN WG1 Meeting #92, R1-1802228, LG Electronics, Feb. 26, 2018.

KR Office Action in Application No. 10-2020-7029788 dated Oct. 16, 2020.

"Remaining details on group-common PDCCH" 3GPP TSG RAN WG1 Meeting 90bis, Panasonic, R1-1718284, Oct. 9, 2017.

* cited by examiner

METHOD AND DEVICE FOR CANCELING UPLINK TRANSMISSION

CROSS-REFERENCE TO RELATED APPLICATION

This application is the U.S. national phase of PCT Application No. PCT/CN2019/077649 filed on Mar. 11, 2019, which claims a priority to Chinese Patent Application No. 201810254010.6 filed on Mar. 26, 2018, the disclosures of which are incorporated in their entireties by reference herein.

TECHNICAL FIELD

This application relates to the field of communications technology, and in particular to a method and a device for canceling an uplink transmission.

BACKGROUND 5G new radio (New Radio, NR) service scenarios usually include: enhanced mobile broadband (Enhanced Mobile Broadband, eMBB) and ultra-reliable low latency communications link (Ultra-Reliable Low latency Communications Link, URLLC). When an eMBB service and a URLLC service need to share a transmission resource (hereinafter referred to as resources, including: at least one of a time-domain resource or a frequency-domain resource), there are usually two methods. One method is semi-static resource allocation, specifically allocating eMBB service transmission and URLLC service transmission on different resources. In this case, it is equivalent to reserving some resources for URLLC services. Due to discreteness and uncertainty of the URLLC services, reserving resources for the URLLC services may cause a waste of resources and result in low resource utilization. The other method is dynamic multiplexing, the eMBB service transmission and URLLC service transmission share a same resource, and a network device dynamically schedules a resource for an eMBB service transmission and a URLLC service transmission.

Since URLLC services have requirements on ultra-low latency, a network device may schedule a URLLC service transmission to a resource that has been allocated for an eMBB service transmission. In addition, because URLLC services have requirements on ultra reliability, it is necessary to reduce the impact and interference of eMBB service transmission on URLLC service transmission. The network device often transmits uplink transmission (Uplink, UL) cancelation indication (Cancelation Indication, CI) signaling to a terminal device that transmits eMBB services to cancel or interrupt the uplink eMBB services that the terminal device has already performed, to achieve this purpose.

In the related art, when receiving the CI, the terminal device does not determine a specific resource where the uplink transmission needs to be canceled, which needs to be determined urgently.

SUMMARY

Embodiments of the present application provide a method and a device for canceling an uplink transmission, to determine a specific resource where the uplink transmission needs to be canceled.

In a first aspect, a method for canceling an uplink transmission is provided, which is applied to a terminal device. The method includes:
determining a first starting time, when receiving an uplink transmission cancelation indication, wherein the first starting time is a starting time of a reference time region; and
determining, based on the first starting time, a target time region for canceling the uplink transmission.

In a second aspect, a terminal device is provided, and the terminal device includes:
a first determining module, configured to determine a first starting time, when receiving an uplink transmission cancelation indication, wherein the first starting time is a starting time of a reference time region; and
a second determining module, configured to determine, based on the first starting time, a target time region for canceling the uplink transmission.

In a third aspect, a terminal device is provided. The terminal device includes a memory, a processor, and a wireless communication program that is stored on the memory and executable on the processor. When executing the wireless communication program, the processor is configured to implement steps of the method described in the first aspect.

In a fourth aspect, a computer-readable medium is provided, and a wireless communication program is stored on the computer-readable medium, and the wireless communication program is executed by a processor to implement steps of the method described in the first aspect.

In embodiments of the present application, a starting time of a reference time region can be determined, when receiving an uplink transmission cancelation indication, a target time region is determined based on the starting time of the reference time region, and then an uplink transmission in the target time region is suspended or canceled. Therefore, a terminal device can be made to determine a specific time-domain resource where the uplink transmission needs to be canceled, and resource scheduling efficiency of a system can be improved.

BRIEF DESCRIPTION OF THE DRAWINGS

In order to more clearly describe a technical solution in embodiments of the present application or the related technologies, the drawings that need to be used in the description of the embodiments or the related technologies will be briefly introduced hereinafter. Obviously, the drawings in the following description are merely some of the embodiments described in the application, and for those of ordinary skill in the art, other drawings may be obtained based on these drawings without creative effort.

DETAILED DESCRIPTION

Figure 1:
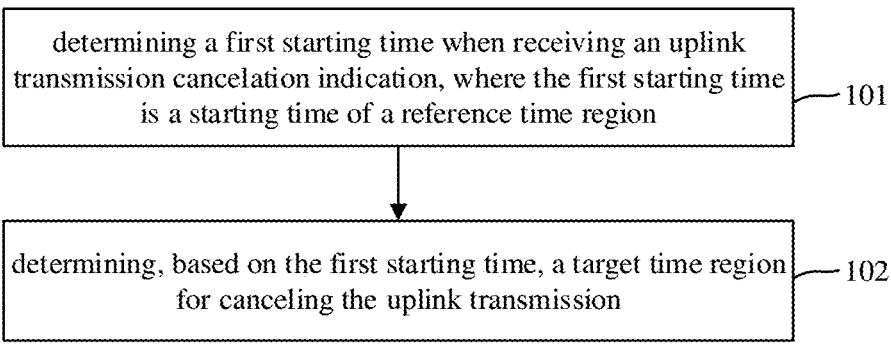
FIG. 1 is a schematic flowchart of a method for canceling an uplink transmission according to an embodiment of the present application.

In order to enable those skilled in the art to better understand the technical solutions in the present application, the technical solutions in the embodiments of the application will be clearly and completely described below with reference to the drawings in the embodiments of the present application. Obviously, the described embodiments are only a part of the embodiments of the present application, rather than all the embodiments. Based on the embodiments in the present application, all other embodiments obtained by those of ordinary skill in the art without creative effort shall fall within the protection scope of the present application.

It should be understood that the technical solutions according to the embodiments of the present application may be applied to various communication systems, such as: global system for mobile communication (Global System of Mobile communication, GSM) system, code division multiple access (Code Division Multiple Access, CDMA) system, wideband code division multiple access (Wideband Code Division Multiple Access, WCDMA) system, general packet radio service (General Packet Radio Service, GPRS), long term evolution (Long Term Evolution, LTE) system, LTE frequency division duplex (Frequency Division Duplex, FDD) system, LTE time division duplex (Time Division Duplex, TDD) system, universal mobile telecommunication system (Universal Mobile Telecommunication System, UMTS), worldwide interoperability for microwave access (Worldwide Interoperability for Microwave Access, WiMAX) communication system, 5G system, or new radio (New Radio, NR) system.

Terminal device (User Equipment, UE), also referred to as mobile terminal (Mobile Terminal), or mobile terminal device, etc., may communicate with one or more core networks via a radio access network (for example, Radio Access Network, RAN). The terminal device may be a mobile terminal, such as a mobile phone (or referred to as "cellular" phone) and a computer with a mobile terminal. For example, the terminal device may be portable, pocket-sized, handheld, computer-built or vehicle-mounted mobile devices, which exchange voice and/or data with a wireless access network.

A network device is a device deployed in a wireless access network device to provide terminal device with the function of canceling an uplink transmission. The network device may be a base station, and the base station may be a base station in GSM or CDMA (Base Transceiver Station) BTS), it may also be a base station (NodeB) in WCDMA, an evolved base station (evolutional Node B, eNB or e-NodeB) and a 5G base station (gNB) in LTE.

It should be noted that when describing specific embodiments, the size of the sequence number of each process does not mean an order of execution. The execution order of each process should be determined by its function and internal logic, and should not be constitute any limitation to implementation processes in the embodiments of the present application.

A method for canceling an uplink transmission for a terminal device will be described below with reference to FIG. 1 to FIG. 15.

FIG. 1 shows a method for canceling an uplink transmission according to an embodiment of the present application, which is applied to a terminal device. As shown in FIG. 1, the method may include the following steps.

Step 101: determining a first starting time when receiving an uplink transmission cancelation indication (uplink cancelation indication, UL CI), where the first starting time is a starting time of a reference time region.

The reference time region may be a preset reference time-domain resource used for determining cancelation of the uplink transmission. The reference time region is usually determined by the first starting time and a total time duration. The manner for determining the first starting time and the total time duration will be described below in conjunction with specific embodiments.

In step 101, specifically, the first starting time may be determined based on a reception time of the uplink transmission cancelation indication and a predetermined time interval. More specifically, a first slot or a first symbol that is after the predetermined time interval from the reception time of the uplink transmission cancelation indication may be determined as the first starting time.

The reception time of the UL CI may be a slot for receiving a downlink control channel (PDCCH) carrying the UL CI, or the time when the UL CI is received may be the last time symbol, hereinafter referred to as symbol, for a UE receiving a PDCCH carrying the UL CI.

The predetermined time interval may be determined based on one of the following manners: a first manner, determining the predetermined time interval based on information included in the uplink transmission cancelation indication, where the information is used to indicate the predetermined time interval; a second manner determining the predetermined time interval based on a higher layer signaling (for example, Radio Resource Control, RRC) used to configure the predetermined time interval; or a third manner, determining the predetermined time interval based on a first preset value, and so on.

In the first manner, the UE may determine the predetermined time interval based on a delay (offset) indicated in the UL CI. The delay may also be equal to K3. K3 is a time duration relative to the reception time of the UL CI, and the unit of K3 may be a slot (slot) or a symbol (symbol). The specific time duration of K3 is related to a subcarrier spacing (SCS). The network device may configure a K3 set among UEs through RRC in advance, and indicate an actual value of K3 in the UL CI.

Optionally, if the UL CI is sent to a group of UEs, the time duration of K3 indicated in the UL CI needs to ensure that each of the UEs receiving the UL CI has sufficient cancelation time (cancelation time), which may be understood as the processing time for the UE to cancel the uplink transmission.

In addition, in the first manner, a boundary of the first slot or the first symbol after K3 from the reception time of the UL CI may be determined as the first starting time.

Specifically, for a given SCS, the first starting time may be the boundary of the first slot after K3 slots or K3 symbols starting from the reception time of the UL CI.

For example, it is assumed that UL CI indicates K3=1 slot, the total time duration of the reference time region is X slots, and the UE receives the UL CI in slot n, the UE may take the ending time of slot n+1 as the first starting time, and correspondingly, may determine X slots immediately after slot n+1 as the reference time region.

For another example, it is assumed that UL CI indicates K3=7 symbols, the total time duration of the reference time region is X slots, and the UE receives the UL CI in symbol i (i is an index of the symbol in the slot, i<7, and i=0-13) of slot n, the UE may take the ending time of slot n+1 as the first starting time, and accordingly, may determine X slots immediately after slot n+1 as the reference time region.

For another example, it is assumed that UL CI indicates K3=14 symbols, the total time duration of the reference time region is X slots, and the UE receives the UL CI in symbol i (i=0-13) of slot n, the UE may take the ending time of slot n+2 as the first starting time, and accordingly, may determine X slots immediately after slot n+2 as the reference time region.

Optionally, under a given SCS, the first starting time may be the first symbol after K3 slots or K3 symbols starting from the reception time of the UL CI.

For example, it is assumed that UL CI indicates K3=7 symbols, the total time duration of the reference time region is X slots, and the UE receives the UL CI in symbol i (i<7, i=0-13) of slot n, then the UE may determine the first symbol after 7 symbols starting from symbol i of slot n as the first starting time, and accordingly, may determine X slots immediately after symbol i+7 of slot n as the reference time region.

For another example, it is assumed that UL CI indicates K3=14 symbols, the total time duration of the reference time region is X slots, and the UE receives the UL CI in symbol i (i=0-13) of slot n, then the UE may determine the first symbol after symbol i of slot n+1 as the first starting time, and accordingly, may determine X slots immediately after symbol i of slot n+1 as the reference time region.

For another example, it is assumed that UL CI indicates K3=14 symbols, the total time duration of the reference time region is Y symbols, and the UE receives the UL CI in symbol i (i=0~13) of slot n, then the UE may determine the first symbol after symbol i of slot n+1 as the first starting time, and accordingly, may determine Y symbols immediately after symbol i of slot n+1 as the reference time region.

In the second manner, the UE may determine the predetermined time interval based on a reference delay (reference offset) configured by a higher-layer signaling (such as RRC), the reference delay may also be a time duration relative to the reception time of the UL CI, and the unit of the reference delay may be a slot (slot) or a symbol (symbol). The specific time duration of the reference delay is related to a subcarrier spacing (SCS).

Optionally, if the UL CI is sent to a group of UEs, the duration of the reference delay configured by a higher-layer signaling (such as RRC) needs to ensure that each of the UEs receiving the UL CI has sufficient cancelation time (cancelation time), which may be understood as the processing time for the UE to cancel the uplink transmission.

Further, a network device may choose to send UL CI to a group of UEs with the same processing capability, for example, to a group of UEs with the same minimum cancelation time duration and the same uplink timing advance (TA) value, so that a higher layer signaling can configure the same reference delay for respective UEs in the group, which is simpler and easier for the network device. If the network device sends UL CI to a group of UEs with different processing capabilities (for example, a group of UEs with different TAs), the network device needs to consider that a UE with the largest TA value has enough cancelation time, when configuring reference delays for respective UEs in the group.

A brief introduction of TA is given below. Since different UEs may be located at different locations in a cell, distances between the UEs and a base station may also be different. Therefore, signals between the base station and the UEs may experience different transmission delays. In order to ensure that the base station maintains timing alignment when receiving uplink signals from different UEs, when sending uplink signals, the UE needs to add an offset based on downlink timing, and the offset value is the TA value, which is usually configured by the base station. The base station can control uplink transmission advance values of different UEs through TA. For a UE that is close to the base station, a transmission delay is smaller, and a smaller TA may be configured; for a UE that is far away from the base station, the experienced transmission delay is larger, and a larger TA needs to be configured.

In the second manner, a boundary of the first slot or the first symbol that is that is after the reference delay from the reception time of the UL CI may be determined as the first starting time.

Specifically, under a given SCS, the boundary of the first slot that is after the reference delay from the reception time of the UL CI may be determined as the first starting time.

For example, assuming that the reference delay configured by RRC is 1 slot, the total time duration of the reference time region is X slots, and the UE receives UL CI in slot n, the UE may use the ending time of slot n+1 as the first starting time, and correspondingly, may determine X slots immediately after slot n+1 as the reference time region.

As another example, assuming that the reference delay configured by RRC is 7 symbols, the total time duration of the reference time region is X slots, and the UE receives UL CI in symbol i (i<7, i=0~13) of slot n, the UE may take the ending time of slot n+1 as the first starting time, and accordingly, may determine X slots immediately after slot n+1 as the reference time region.

As another example, assuming that the reference delay configured by RRC is 14 symbols, the total time duration of the reference time region is X slots, and the UE receives UL CI in symbol i (i=0~13) of slot n, the UE may take the ending time of slot n+2 as the first starting time, and accordingly, may determine X slots immediately after slot n+2 as the reference time region.

Optionally, under a given SCS, the first starting time may be the first symbol that is after the reference delay from the reception time of the UL CI.

For example, assuming that the reference delay configured by RRC is 7 symbols, the total time duration of the reference time region is X slots, and the UE receives UL CI in symbol i (i<7, i=0~13) of slot n, then the UE may determine the first symbol after 7 symbols starting from symbol i of slot n as the first starting time, and accordingly, may determine X slots immediately after symbol i+7 of slot n as the reference time region.

As another example, assuming that the reference delay configured by RRC is 14 symbols, the total time duration of the reference time region is X slots, and the UE receives UL CI in symbol i (i=0~13) of slot n, then the UE may determine the first symbol after symbol i of slot n+1 as the first starting time, and accordingly, may determine X slots immediately after symbol i of slot n+1 as the reference time region.

As another example, assuming that the reference delay configured by RRC is 14 symbols, the total time duration of the reference time region is Y symbols, and the UE receives UL CI in symbol i (i=0~13) of slot n, then the UE may determine the first symbol after symbol i of slot n+1 as the first starting time, and accordingly, may determine Y symbols immediately after symbol i of slot n+1 as the reference time region.

In the third manner, the UE may determine the predetermined time interval based on a set minimum cancelation time, that is, the first preset value may be the minimum cancelation time. The minimum cancelation time may be understood as the shortest processing time required for the UE to cancel the uplink transmission. The duration of the time is related to UE's capability and SCS. Generally speaking, the stronger the UE's capability is, the shorter the minimum cancelation time is, and otherwise, the longer the cancelation time is. The unit of the minimum cancelation time is a slot or a symbol.

The minimum cancelation time may be either predetermined by a protocol or configured by the network device for the UE. Generally, TA is not included in the minimum cancelation time.

In a case that the first preset value is the minimum cancelation time, the third manner may specifically include: determining the predetermined time interval according to a value of the uplink timing advance and the minimum cancelation time. More specifically, the sum of the value of the uplink timing advance and the minimum cancelation time (minimum cancelation time plus TA) may be determined as the predetermined time interval. In addition, the boundary of the first slot or the first symbol that is after the minimum cancelation time plus TA from the reception time of the UL CI may be determined as the first starting time.

In the third manner of determining the predetermined time interval, the TA value may be a UE-specific TA value; the TA value may also be the maximum value of TA values of all UEs in a UE group where the UE is located, and the maximum value may be obtained through RRC configuration. The TA value may also be a set reference TA value, such as the maximum configurable TA value.

Specifically, under a given SCS, the boundary of the first slot after the minimum cancelation time plus TA has elapsed from the reception time of the UL CI may be determined as the first starting time.

For example, assuming that the minimum cancelation time is equal to 10 symbols, the total time duration of the reference time region is X slots, TA is 4 symbols, the minimum cancelation time plus TA is equal to 14 symbols, and the UE receives UL CI in symbol i=7 (i=7~13) of slot n, the UE may take the ending time of slot n+2 as the first starting time, and accordingly, may determine X slots immediately after slot n+2 as the reference time region.

Optionally, under a given SCS, the first symbol that is after the minimum cancelation time plus TA from the reception time of the UL CI may be determined as the first starting time.

For example, assuming that the minimum cancelation time is equal to 10 symbols, the total time duration of the reference time region is X slots, TA is 4 symbols, the minimum cancelation time plus TA is equal to 14 symbols, and the UE receives UL CI in symbol i (i=0~13) of slot n, the UE may use the first symbol after symbol j of slot n+m as the first starting time, and accordingly, may determine X slots immediately after symbol j of slot n+m as the reference time region, where m=floor ((i+minimum cancelation time+TA)/14), j=mod(i+minimum cancelation time+TA, 14), the function floor( ) means rounding down, and the function mod( ) means taking a remainder after dividing.

Optionally, under a given SCS, when the TA is specifically a UE group-specific TA, the minimum cancelation time after the reception time of UL CI plus the boundary of the first slot or the first symbol immediately after the UE group-specific TA may be determined as the first starting time.

Specifically, when multiple UEs are configured to detect the same UL CI, the TA may be the UE group-specific TA that is configured by the network device, and the UE group-specific TA may enable all UEs in the same UE group to have sufficient cancelation time (cancelation time). For example, the UE group-specific TA may be the maximum value among the TA values of all UEs in the UE group.

Optionally, under a given SCS, when TA is a reference TA, the minimum cancelation time starting from the reception time of UL CI, plus the boundary of the first slot or the first symbol after the reference TA is determined as the first starting time.

Specifically, when multiple UEs are configured to detect the same UL CI, the TA may be a reference TA configured for the network device, and the reference TA may enable all UEs in the same UE group to have sufficient cancelation time (cancelation time). For example, the reference TA may be the maximum value among configurable TA values.

Step 102: determining, based on the first starting time, a target time region for canceling the uplink transmission.

The target time region may be understood as a time region in which the uplink transmission is to be canceled, and the target time region is usually located within the reference time region described in step 101.

Optionally, after the target time region is determined in step 102, the method for canceling an uplink transmission provided by an embodiment of the present disclosure may further include: suspending or canceling the uplink transmission in the target time region. Of course, in practical applications, if there is not enough cancelation time between the reception time of the UL CI and the target time region, the UE may ignore the UL CI. In general, the cancelation time is equal to the minimum cancelation time plus TA, and the TA is a TA currently indicated or configured by a network for the UE.

Several possible and specific implementation manners of step 102 are described below.

In a first implementation manner, before step 102, the method for canceling an uplink transmission provided by an embodiment of the present disclosure may further include: determining a total time duration of the reference time region. Correspondingly, step 102 may specifically include: determining the target time region based on the total time duration and the first starting time.

Exemplarily, the total time duration of the reference time region may be determined based on one of the following manners.

The total time duration is determined based on a higher layer signaling (for example, RRC) used to configure the total time duration. The unit of the total time duration L may be a slot or a symbol. The value of L is related to numerology of uplink (Uplink, UL) bandwidth part (Bandwidth Part, BWP). If the unit of the total time duration L is a slot, the value of L may be 1, 2, 4, 5, etc. If the unit of the total time duration L is a symbol, the value of L may be 7, 14, 28 symbols, etc.

Optionally, the total time duration is determined based on a monitoring periodicity of the uplink transmission cancelation indication. If the monitoring periodicity of UL CI is X slots or Y symbols, the total time duration of the reference time region may also be X slots or Y symbols. A value of the monitoring periodicity of the UL CI may be 7 symbols, 1 slot, 2 slots, and so on.

Optionally, the total time duration is determined based on a second preset value, that is, the time duration of the reference time region may be a fixed value, for example, 1 slot.

More specifically, in step 102, a time region with the total time duration and starting from the first starting time may be determined as the target time region, that is, the reference time region is determined as the target time region.

For example, assuming that the starting time (first starting time) and the total time duration of the reference time region are known, and the UL CI does not include target starting time information and target time duration information for canceling the uplink transmission, that is, the UL CI does not indicate canceled slot(s)/symbol(s) in the reference time region, the UE may determine the reference time region as the target time region for canceling the uplink transmission, and may cancel the uplink transmission in the target time region.

Figure 2:
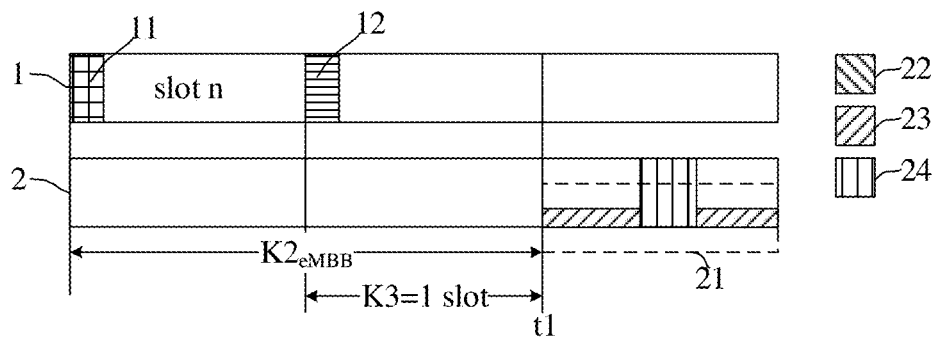
FIG. 2 is another schematic diagram of a method for canceling an uplink transmission according to an embodiment of the present application.

Specifically, as shown in FIG. 2, suppose that the UE determines K3=1 slot according to UL CI, the total time duration of the reference time region is 1 slot, and the UE receives the UL CI in slot n (reference sign 12 in FIG. 2), the UE may determine that the first starting time t1 is the starting time (boundary) of the first slot after K3 from slot n, and that the reference time region is slot n+1 (reference sign 21 in FIG. 2). The UE may cancel an uplink eMBB service transmission in the reference time region 21 (i.e., slot n+1)).

In specific implementation, the network device may preconfigure a K3 set as shown in Table 1 below for the UE through RRC signaling. The UL CI indicates an index in this table, and the UE queries Table 1 through the index to determine a specific K3 value. It should be noted that when indicating K3 through the UL CI, the network device shall consider the capability of the UE.

TABLE 1

| Bit-field in UL CI | Value or slot of K3 |
|---|---|
| 00 | 0 |
| 01 | 1 |
| 10 | 2 |
| 11 | 3 |

It should be noted that in the drawings of this specification, $K2_{eMBB}$ represents a time-domain resource occupied by eMBB service transmission, reference numeral 1 represents downlink (Downlink, DL), reference numeral 2 represents uplink (Uplink, UL), reference numeral 11 indicates uplink scheduling signaling for scheduling the eMBB transmission (UL grant for eMBB), reference numeral 12 represents UL CI, reference numeral 21 represents a reference time region, a filling pattern in the box indicated by reference numeral 22 represents eMBB service transmission, a filling pattern in the box indicated by reference numeral 23 represents cancelation of the eMBB service of uplink transmission, a filling pattern in the box indicated by reference numeral 24 indicates URLLC service transmission, and reference numeral 25 represents a symbol. To save space, the corresponding reference numerals will be directly quoted below, and the meanings thereof will not be repeated.

Figure 3:
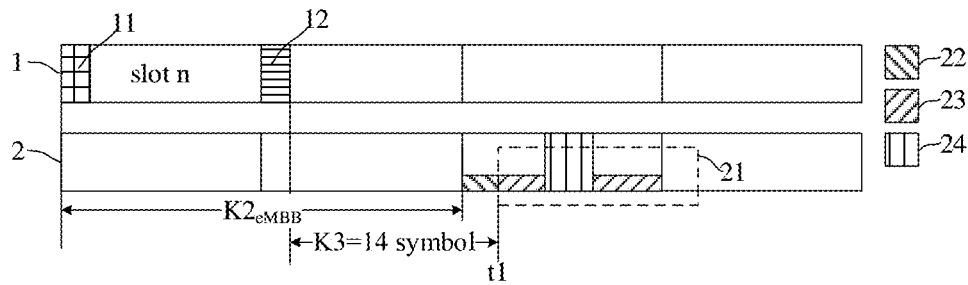
FIG. 3 is another schematic diagram of a method for canceling an uplink transmission according to an embodiment of the present application.

As shown in FIG. 3, it is assumed that the UE determines K3=14 symbols according to the UL CI, the total time duration of the reference time region is Y symbols, and the UE receives the UL CI (reference sign 12 in FIG. 3) in symbol i (i=0~13) of slot n, the UE may determine that the first starting time t1 is the first symbol after K3 from slot n, and the reference time region is Y symbols (reference sign 21 in FIG. 3) starting from symbol i of slot n+1. The UE may cancel the uplink eMBB service transmission in the reference time region 21 (the filling pattern indicated by the reference number 23 in FIG. 3).

In specific implementation, the network device may preconfigure a K3 set as shown in Table 2 below for the UE through RRC signaling. The UL CI indicates an index in this table, and the UE queries Table 2 through the index to determine a specific K3 value. It should be noted that when indicating K3 through the UL CI, the network device shall consider the capability of the UE.

TABLE 2

| Bit-field in UL CI | Value or slot of K3 |
|---|---|
| 00 | delay 1 |
| 01 | delay 2 |
| 10 | delay 3 |
| 11 | delay 4 |

In a second implementation manner, before step 102, the method for canceling an uplink transmission provided in an embodiment of the present disclosure may further include: determining the total time duration of the reference time region. Correspondingly, the foregoing step 102 may specifically include: determining the target time region based on the total time duration and the first starting time. In addition, the UL CI includes target starting time information for indicating a time-domain resource where the uplink transmission is to be canceled, and the method for canceling an uplink transmission provided in an embodiment of the present disclosure may further include: determining a second starting time for canceling the uplink transmission based on the first starting time and the target starting time information. The second starting time is relative to the first starting time. Normally, the second starting time is later than or equal to the first starting time.

Correspondingly, the determining the target time region based on the total time duration and the first starting time includes: determining an ending time of the reference time region based on the total time duration and the first starting time; and determining, as the target time region, a time region from the second starting time to the ending time.

For example, assuming that the starting time (first starting time) and the total time duration of the reference time region are known, UL CI further indicates target starting time information (second starting time) for canceling an uplink transmission, that is, UL CI indicates canceled slot(s)/symbol(s) in the reference time region, the UE may determine a time region from the second starting time to the ending time of the reference time region as the target time region, and may cancel the uplink transmission in the target time region.

Specifically, a bit-field may be used in UL CI to indicate the second starting time (second starting symbol), and the size of the bit-field may be: Bit-field size=ceil(log 2($N_{symbol}$*X/$N_{bundle\_size}$)), where the formula ceil ( ) means to obtain the smallest integer greater than or equal to a value in parentheses (rounding up), X represents the total number of slots in the reference time region, and $N_{symbol}$ represents a symbol number in a slot; $N_{bundle\_size}$ represents the size of a sub-region (or the size of a symbol bundle (symbol bundle size)), which may also be referred to as the number of symbols in the sub-region. $N_{bundle\_size}$ may be understood as the granularity of each sub-region. The sub-region (or symbol bundle) will be separately explained below and will not be described herein.

Figure 4:
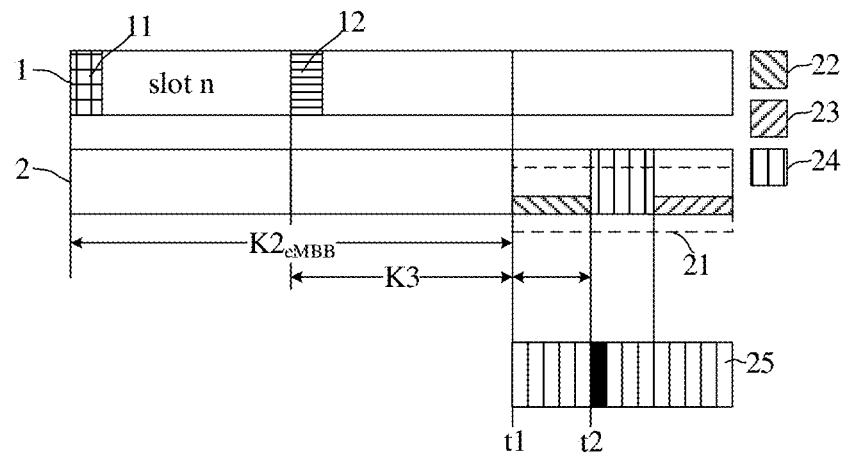
FIG. 4 is another schematic diagram of a method for canceling an uplink transmission according to an embodiment of the present application.

As shown in FIG. 4, it is assumed that the UE determines K3=1 slot according to UL CI, the total time duration of the reference time region is 1 slot (X=1), and the UE receives the UL CI in slot n (reference sign 12 in FIG. 4), the UE may determine that the first starting time t1 is a boundary of the first slot after K3 from slot n, and the reference time region is slot n+1 (reference sign 21 in FIG. 4). Additionally, it is assumed that the UL CI further indicates that the second starting time t2 is the fifth symbol after the first starting time t1 (starting symbol is symbol 5), the size of the bit-field in the UL CI used to indicate t1 is: Bit–field size=ceil(log 2($N_{symbol}$)), and the granularity of the sub-region is 1 symbol. The UE may determine the time region between symbol 5 and symbol 13 in slot n+1 as the target time region, and cancel the uplink eMBB service transmission in the time region between symbol 5 and symbol 13 in slot n+1 (the filling pattern indicated by the reference number 23 in FIG. 4).

Figure 5:
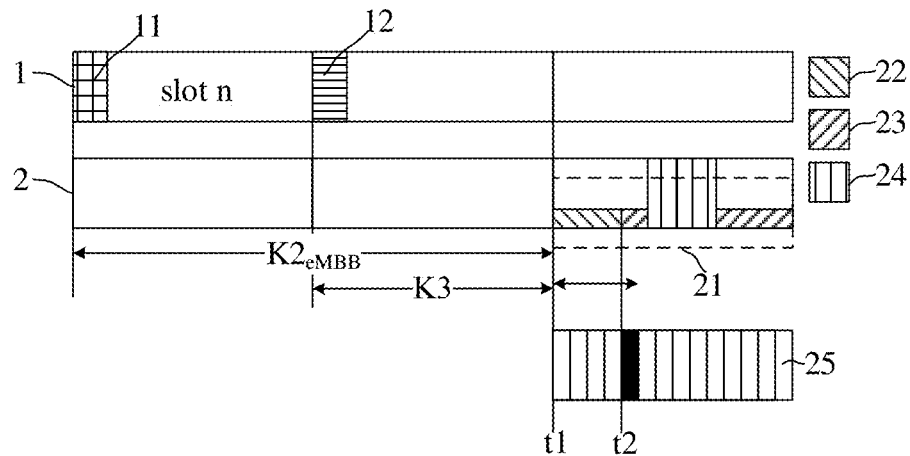
FIG. 5 is another schematic diagram of a method for canceling an uplink transmission according to an embodiment of the present application.

As shown in FIG. 5, it is assumed that the UE determines K3=1 slot according to UL CI, the total time duration of the reference time region is 1 slot (X=1), and the UE receives the UL CI in slot n (reference sign 12 in FIG. 5), the UE may determine that the first starting time t1 is a boundary of the first slot after K3 from slot n, and the reference time region is slot n+1 (reference sign 21 in FIG. 5). In addition, it is assumed that the UL CI further indicates that the second starting time t2 is the fourth symbol after the first starting time t1 (the starting symbol is symbol 4), the size of the bit-field in the UL CI used to indicate t1 is: Bit–field size=ceil(log 2($N_{symbol}$/2)), and the granularity of the sub-region is 2 symbols. The UE may determine the time region between symbol 4 and symbol 13 in slot n+1 as the target time region, and cancel the uplink eMBB service transmission in the time region between symbol 4 and symbol 13 in slot n+1 (the filling pattern indicated by the reference number 23 in FIG. 5).

Figure 6:
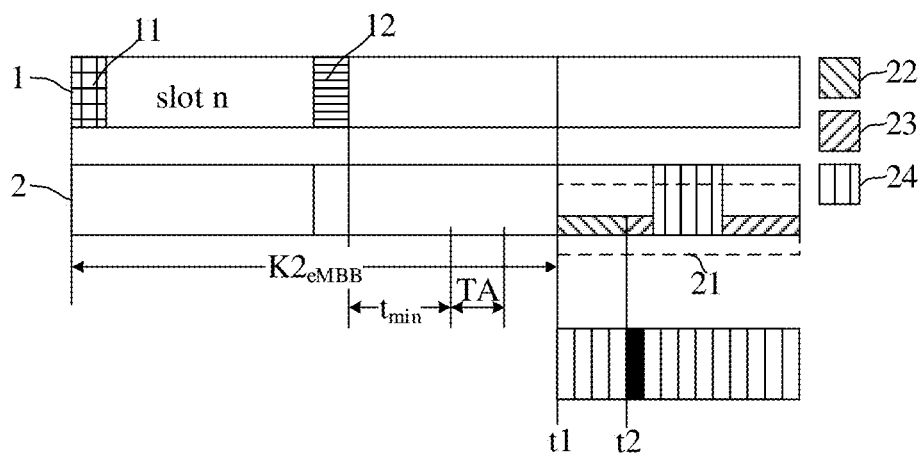
FIG. 6 is another schematic diagram of a method for canceling an uplink transmission according to an embodiment of the present application.

As shown in FIG. 6, it is assumed that the UE determines the predetermined time interval to be 12 symbols according to the minimum cancelation time ($t_{min}$=10 symbols) and TA (2 symbols), and the total time duration of the reference time region is 1 slot (X=1), the UE receives the UL CI (reference sign 12 in FIG. 6) at the first symbol of slot n, the UE may determine that the first starting time t1 is a boundary of the first slot after 12 symbols from the first symbol of slot n, and the reference time region is slot n+1 (reference sign 21 in FIG. 6). In addition, it is assumed that the UL CI further indicates that the second starting time t2 is the fourth symbol after the first starting time t1 (starting symbol is 4), the size of the bit-field used to indicate t1 in the UL CI is: Bit–field size=ceil(log 2($N_{symbol}$/21)), and the granularity of the sub-region is 2 symbols. The UE may determine the time region between symbol 4 and symbol 13 in slot n+1 as the target time region, and cancel the uplink eMBB service transmission in the time region between symbol 4 and symbol 13 in slot n+1 (the filling pattern indicated by the reference number 23 in FIG. 6).

Figure 7:
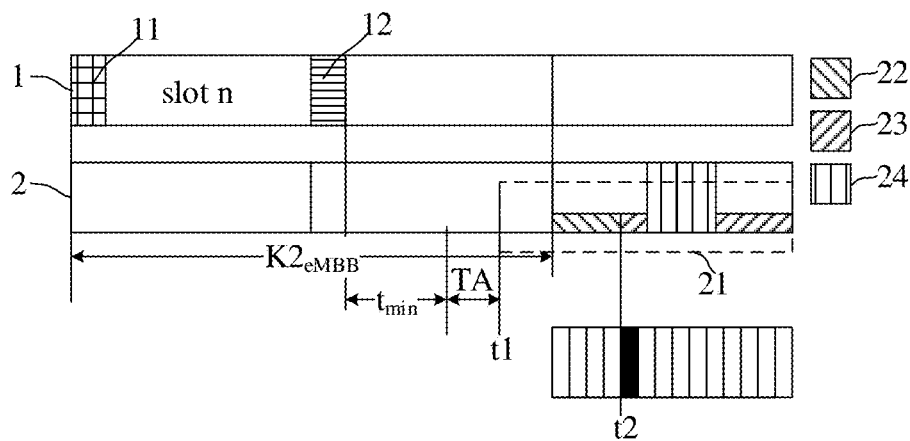
FIG. 7 is another schematic diagram of a method for canceling an uplink transmission according to an embodiment of the present application.

As shown in FIG. 7, it is assumed that the UE determines the predetermined time interval as 12 symbols, based on the minimum cancelation time ($t_{min}$=10 symbols) and TA (2 symbols), the total time duration of the reference time region is Y symbols, and the UE receives the UL CI in the first symbol of slot n (reference sign 12 in FIG. 7), the UE may determine that the first starting time t1 is the first symbol after 12 symbols from the first symbol of slot n, the reference time region is Y symbols starting from the first starting time t1 (reference sign 21 in FIG. 7). In addition, it is assumed that the UL CI further indicates that the second starting time t2 is the fifth symbol after the first starting time t1 (the starting symbol is symbol 5), the size of the bit-field in the UL CI used to indicate t1 is: Bit–field size=ceil(log 2(Y/2)), and the granularity of the sub-region is 2 symbols. The UE may determine a time region between the fifth symbol after the first starting time t1 and the $Y^{th}$ symbol after the first starting time t1 as the target time region, and cancel the uplink eMBB service transmission in the target time region 1 (the filling pattern indicated by the reference number 23 in FIG. 7).

In a third implementation manner, before step 102, the method for canceling an uplink transmission provided by an embodiment of the present disclosure may further include: determining the total time duration of the reference time region. Correspondingly, the step 102 may specifically include: determining the target time region based on the total time duration and the first starting time. In addition, the UL CI includes target starting time information for indicating canceling a time-domain resource of the uplink transmission, and the method for canceling an uplink transmission provided in an embodiment of the present disclosure may further include: determining a second starting time for canceling the uplink transmission based on the first starting time and the target starting time information. The second starting time is relative to the first starting time. Normally, the second starting time is later than or equal to the first starting time.

Correspondingly, the foregoing step 102 may specifically include: determining a time region with the target time duration and starting from the second starting time as the target time region, and suspending or canceling uplink eMBB service transmission in the target time region. Normally, the target time region determined in this way is within the aforementioned reference time region.

Specifically, a bit-field may be used in UL CI to indicate the second starting time and the target time duration (start and length indicator, SLIV), and the target time duration does not exceed the total time duration of the reference region. The size of the bit-field may be: Bit-field size=ceil (log $2(N_{symbol}*X/N_{bundle\_size})*(N_{symbol}*X/N_{bundle\_size}+1)/2$)), where X represents the total number of slots in the reference time region, and $N_{symbol}$ represents an index of a symbol in a slot; $N_{bundle\_size}$ represents the size of each sub-region (or the size of a symbol bundle (symbol bundle size)), which may also be referred to as the number of symbols in the sub-region. $N_{bundle\_size}$ may be understood as the granularity of the sub-region. The sub-region (or symbol bundle) will be separately explained below and will not be described herein.

Figure 8:
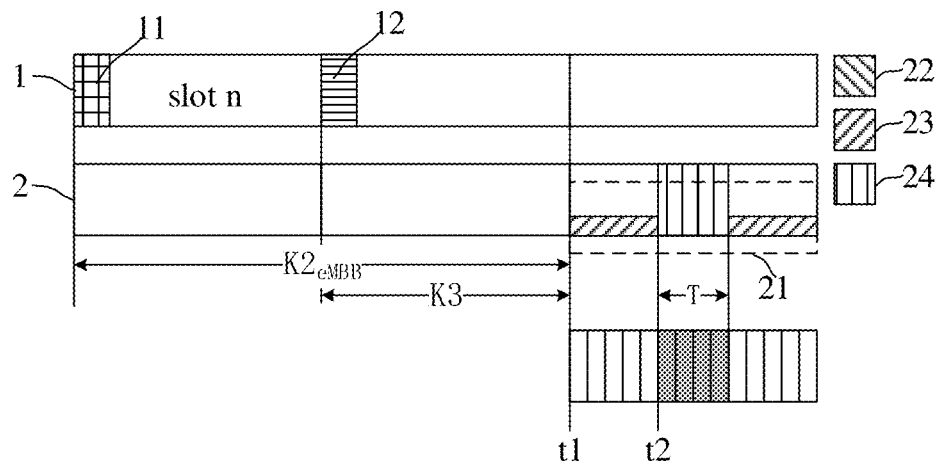
FIG. 8 is another schematic diagram of a method for canceling an uplink transmission according to an embodiment of the present application.

As shown in FIG. 8, it is assumed that the UE determines K3=1 slot according to UL CI, the total time duration of the reference time region is 1 slot (X=1), and the UE receives the UL CI in slot n (FIG. 8), the UE determines a boundary of the first slot after K3 from slot n as the first starting time t1, and slot n+1 as the reference time region (reference sign 21 in FIG. 8). Additionally, it is assumed that the UL CI further indicates that the second starting time t2 is the fifth symbol after the first starting time t1 (the starting symbol is symbol 5), the target time duration T is 3 symbols, the size of the bit-field in the UL CI used to indicate t1 and T is: Bit-field=ceil(log $2(N_{symbol}*(N_{symbol}+1)/2)$), and the granularity of the sub-region is 1 symbol. The UE may determine the time region between symbol 5 and symbol 8 in slot n+1 as the target time region, and cancel the uplink eMBB service transmission in the time region between symbol 5 and symbol 8 in slot n+1 (the filling pattern indicated by the reference number 23 in FIG. 8).

Figure 9:
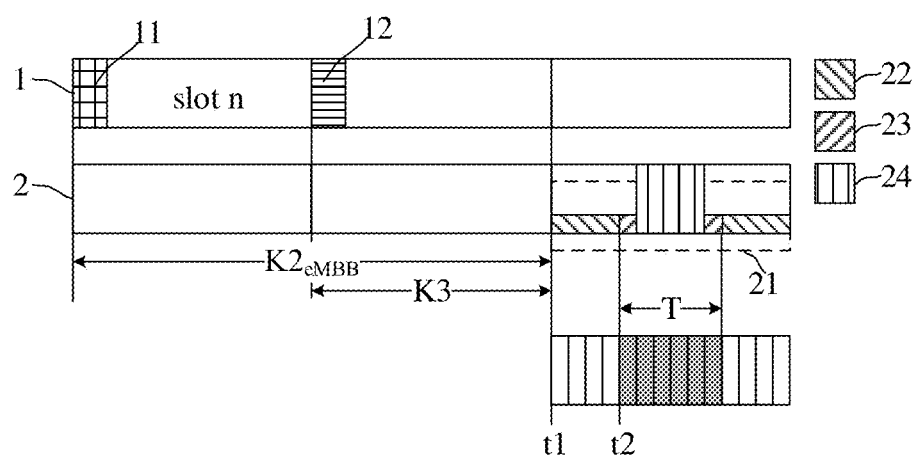
FIG. 9 is another schematic diagram of a method for canceling an uplink transmission according to an embodiment of the present application.

As shown in FIG. 9, it is assumed that the UE determines K3=1 slot according to UL CI, the total time duration of the reference time region is 1 slot (X=1), and the UE receives the UL CI in slot n (reference sign 12 in FIG. 9), the UE determines a boundary of the first slot after K3 from slot n as the first starting time t1, and slot n+1 as the reference time region (reference sign 21 in FIG. 9). In addition, it is assumed that the UL CI further indicates that the second starting time t2 is the fourth symbol after the first starting time t1 (the starting symbol is symbol 4), the target time duration T is 5 symbols, the size of the bit-field in the UL CI used to indicate t1 and T is: Bit-field=ceil(log $2(N_{symbol}/2)*(N_{symbol}+1)/2)$), and the granularity of the sub-region is 2 symbols. The UE may determine the time region between symbol 4 and symbol 9 in slot n+1 as the target time region, and cancel the uplink eMBB service transmission in the time region between symbol 4 and symbol 9 in slot n+1 (the filling pattern indicated by the reference number 23 in FIG. 9).

Figure 10:
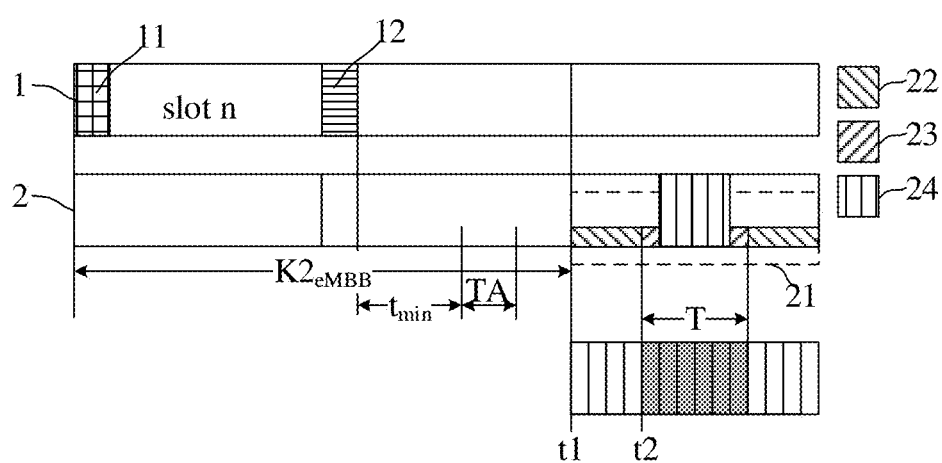
FIG. 10 is another schematic diagram of a method for canceling an uplink transmission according to an embodiment of the present application.

As shown in FIG. 10, it is assumed that the UE determines the predetermined time interval to be 12 symbols according to the minimum cancelation time ($t_{min}$=10 symbols) and TA (TA=2 symbols), and the total time duration of the reference time region is 1 hour. Slot (X=1), the UE receives UL CI in the first symbol of slot n (reference sign 12 in FIG. 10), the UE may determine that the first starting time t1 is a boundary of the first slot after 12 symbols from the first symbol of slot n, and the reference time region is slot n+1 (reference sign 21 in FIG. 10). In addition, it is assumed that the UL CI further indicates that the second starting time t2 is the fourth symbol after the first starting time t1 (the starting symbol is symbol 4), the target time duration T is 5 symbols, the size of the bit-field in the UL CI used to indicate t1 is: Bit-field=ceil(log $2(N_{symbol}/2)$ (Nsymbol+1)/2)), and the granularity of the sub-region is 2 symbols. The UE may determine the time region between symbol 4 and symbol 9 in slot n+1 as the target time region, and cancel the uplink eMBB service transmission in the time region between symbol 4 and symbol 9 in slot n+1 (the filling pattern indicated by the reference number 23 in FIG. 10).

Figure 11:
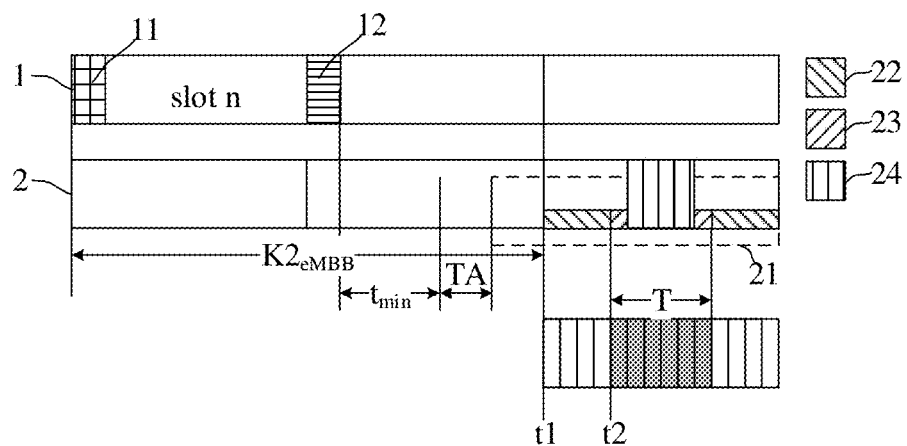
FIG. 11 is another schematic diagram of a method for canceling an uplink transmission according to an embodiment of the present application.

As shown in FIG. 11, it is assumed that the UE determines the predetermined time interval to be 12 symbols according to the minimum cancelation time ($t_{min}$=10 symbols) and TA (TA=2 symbols), and the total time duration of the reference time region is Y symbols, the UE receives the UL CI (reference sign 12 in FIG. 11) in the first symbol of slot n, the UE may determine that the first starting time t1 is the first symbol after 12 symbols starting from the first symbol of slot n (reference sign 21 in FIG. 6), and the reference time region is Y symbols starting from the first starting time t1 (reference sign 21 in FIG. 11). In addition, it is assumed that the UL CI further indicates that the second starting time t2 is the fifth symbol after the first starting time t1 (the starting symbol is symbol 4), and the target time duration T is 6 (duration=6) symbols, the size of the bit-field in the UL CI used to indicate t1 and T is: Bit-field size=ceil(log $2(Y/2*(Y+1)/2))$, the granularity of the sub-region is 2 symbols, where the formula ceil ( ) means to obtain the smallest one of integers greater than or equal to a value in parentheses. The UE may determine the time region between the fifth symbol after the first starting time t1 and the eleventh symbol after the first starting time t1 as the target time region, and cancel the uplink eMBB service transmission in the target time region (the filling pattern indicated by the reference number 23 in FIG. 11).

In the method for canceling an uplink transmission provided by the embodiments of the present disclosure, a starting time of a reference time region can be determined when receiving an uplink transmission cancelation indication, a target time region is determined based on the starting time of the reference time region, and then the uplink transmission on the target time region is suspended or canceled. Therefore, the terminal device can be made to determine a specific time-domain resource where the uplink transmission needs to be canceled, and resource scheduling efficiency of a system can be improved.

In another embodiment of the present disclosure, the method for canceling a resource of an uplink transmission may include: when an uplink transmission cancelation indication (UL CI) is received, determining a slot for canceling the uplink transmission based on a delay (offset) indicated in an uplink transmission cancelation indication; and determining a target time region for canceling the uplink transmission according to a starting symbol where the uplink transmission is to be canceled, and a slot for canceling the uplink transmission, which are indicated in the uplink transmission cancelation indication. That is, without setting a reference time region (or implicitly setting the reference time region), the UL CI indicates the delay and a slot or a symbol that is to be actually canceled (canceled slot(s)/symbol(s)).

The determining the slot for canceling the uplink transmission based on the delay (offset) indicated in the uplink transmission cancelation indication includes: determining, as the slot for canceling the uplink transmission, a first symbol that is after the delay from a reception time of the uplink transmission cancelation indication.

Specifically, a set of K3 delays may be configured for the UE in advance through RRC (see Table 1 above), UL CI indicates a specific value of K3, and the UE determines a slot where a symbol to be canceled is located according to the reception time of UL CI and K3, and then cancels the uplink transmission in this slot starting from the indicated starting symbol.

Figure 12:
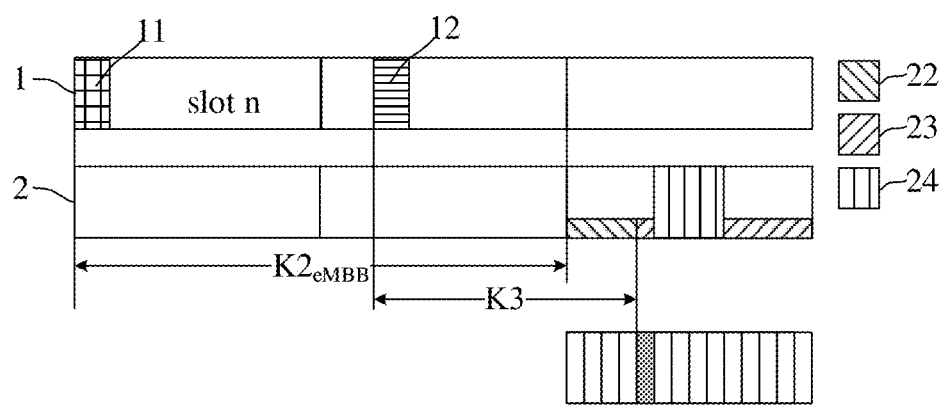
FIG. 12 is another schematic diagram of a method for canceling an uplink transmission according to an embodiment of the present application.

Specifically, as shown in FIG. 12, it is assumed that the UE receives UL CI (reference sign 12 in FIG. 12) in symbol i of slot n, the UL CI indicates the specific value of K3, and UE determines the slot for canceling the uplink transmission is slot n+1 based on the reception time of the UL CI and K3. In addition, assuming that the UL CI further indicates that the starting symbol to cancel the uplink transmission is 4 (the starting symbol is symbol 4), a time region between symbol 4 in slot n+1 and the last symbol in slot n+1 may be determined as the target time region, and the uplink eMBB service transmission in the time region between symbol 4 in slot n+1 and the last symbol in slot n+1 may be canceled (the filling pattern indicated by the reference number 23 in FIG. 12).

For another example, it is assumed that a bit-field is used in UL CI to indicate the starting symbol of symbols to cancel the uplink transmission (canceled symbol(s)) relative to the reception time of the UL CI, and the size of a bit-field pre-configured by the network device through RRC is: Bit-field size=ceil(log 2(max_total_symbol_num/$N_{bundle\_size}$)) where $N_{bundle\_size}$ represents the size of a symbol bundle (symbol bundle size), and the farthest starting symbol is indicated by the UL CI based on RRC configuration, and this configuration also determines the size of the bit-field; max_total_symbol_num represents the total number of symbols in the reference time region implicitly configured in RRC or by default. After receiving the UL CI, the UE determines the slot where the starting symbol to cancel the uplink transmission is located, according to indication in the bit-field, and then cancels the uplink transmission in the slot starting from the indicated starting symbol.

For another example, it is assumed that a bit-field in UL CI is used to indicate the starting symbol of symbols to cancel the uplink transmission (canceled symbol(s)) and a target time duration (duration) relative to the reception time of the UL CI, that is, UL CI indicates SLIV. The size of a bit-field pre-configured by the network device through RRC is: Bit-field size=ceil(log 2(max_total_symbol_num/$N_{bundle\_size}$))*(max_total_symbol_num/$N_{bundle\_size}$)1)/2), where $N_{bundle\_size}$ represents the size of a symbol bundle (symbol bundle size), and the farthest starting symbol is indicated by the UL CI based on RRC configuration, and this configuration also determines the size of the bit-field. After receiving the UL CI, the UE determines the starting symbol where the uplink transmission is to be canceled and the target time duration, according to SLIV indicated in the bit-field of the UL CI, and then cancels the uplink transmission in the time-domain resource with the target time duration starting from the indicated starting symbol.

The sub-region (or symbol bundle) mentioned above are described below.

Optionally, the method for canceling an uplink transmission provided by any embodiment of the present disclosure may further include: based on a higher layer signaling (for example, RRC) for dividing the reference time region, dividing the reference time region into a plurality of sub-regions of a preset time duration, or dividing a slot into a plurality of sub-regions with a preset time duration, so as to reduce the size of the bit-field in the UL CI, thereby saving transmission resources.

The preset time duration is greater than or equal to one symbol; the target starting time information is used to indicate canceling a start sub-region in sub-regions included in the time-domain resource for canceling the uplink transmission, and the target time duration information is used to indicate the number of the sub-regions included in the time-domain resource for canceling the uplink transmission.

For example, assuming that a slot has 14 symbols, in a case that the size of the sub-region is equal to 1 symbol, UL CI requires 4 bits (which can indicate symbols 0-15) to realize the indication of all symbols in one slot; in a case that the size of the sub-region is equal to 2 symbols (bundle of 2 symbols), the slot includes 7 sub-regions, and UL CI requires 3 bits (indicating sub-regions 0-7) to indicate all sub-regions in the slot. Therefore, by bundling symbols in the slot or in the reference time region, the size of the bit-field in the UL CI can be reduced, and the transmission resources occupied by the UL CI can be reduced.

In a specific implementation, the size of the sub-region (or the size of the symbol bundle) may be configured by the network device through RRC.

Figure 13:
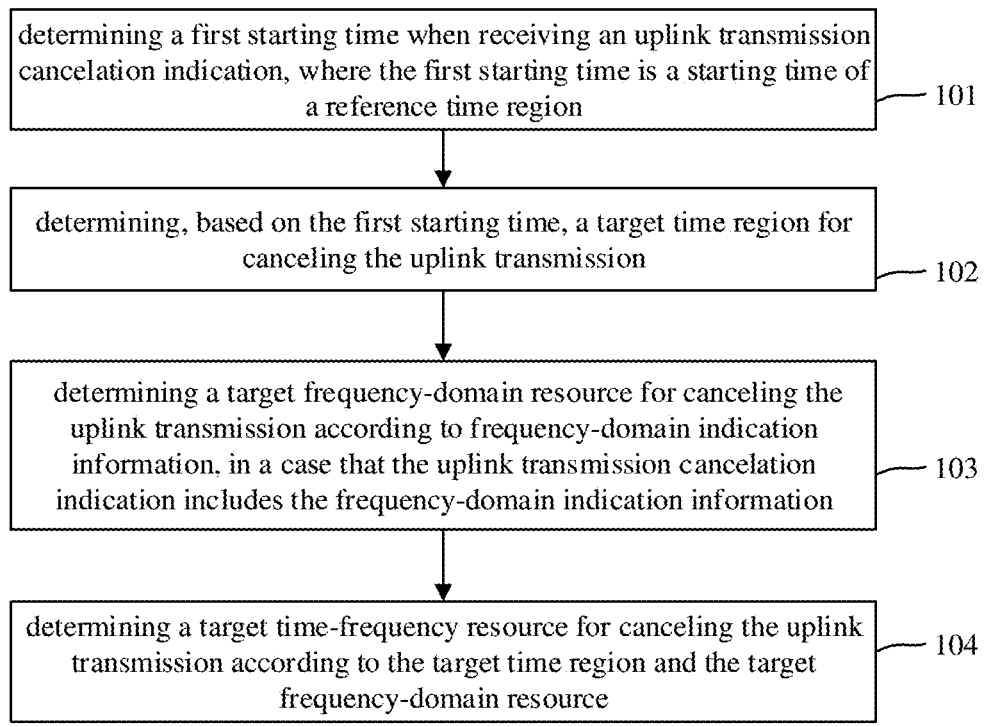
FIG. 13 is another schematic flowchart of a method for canceling an uplink transmission according to an embodiment of the present application.

Optionally, as shown in FIG. 13, the method for canceling an uplink transmission provided by any embodiment of the present disclosure may further include step 103: determining a target frequency-domain resource for canceling the uplink transmission according to frequency-domain indication information, in a case that the uplink transmission cancelation indication includes the frequency-domain indication information.

The above UL CI may include frequency-domain indication information, or may not include frequency-domain indication information. Before the terminal device receives the UL CI, it may usually be determined (as specified by the higher layer signaling configuration or protocol) that whether the UL CI includes frequency-domain indication information or not.

The aforementioned frequency-domain indication information may be used to indicate a target frequency-domain resource where the uplink transmission is to be suspended or canceled. The target frequency-domain resource mentioned herein may be a certain reference frequency region (Reference Frequency region); or may also be one or multiple frequency band subsets of a reference frequency-domain region.

The above-mentioned reference frequency-domain region may be determined according to a higher layer signaling from the network device, or may be agreed in a protocol. In a specific implementation manner, the reference frequency-domain region is an uplink BWP currently activated by the terminal device by default. In another specific implementation manner, the reference frequency-domain region is a frequency-domain bandwidth configured by the network device through a higher layer signaling. The frequency-domain bandwidth configured herein may be the above-mentioned currently activated uplink BWP, or may be part of the bandwidth of the currently activated uplink BWP.

Step 104: determining a target time-frequency resource for canceling the uplink transmission according to the target time region and the target frequency-domain resource.

Of course, after the target frequency-domain resource is determined, the terminal device may further suspend or cancel the uplink transmission in the target time-frequency resource, thereby achieving requirements of URLLC services on low latency and high reliability.

As mentioned above, the frequency-domain indication information in the UL CI may be used to indicate one or multiple frequency band subsets of a reference frequency-domain region, that is, target frequency-domain resources. These frequency band subsets may be obtained by dividing the reference frequency-domain region. For example, the reference frequency-domain region has a bandwidth of 400 MHz to 500 MHz, which is divided into 10 equal frequency band subsets, a first frequency band subset is 400 MHz to 410 MHz; a second frequency band subset is 410 MHz to 420 MHz; . . . ; and a tenth frequency band subset is 490 MHz to 500 MHz.

The size of each frequency band subset or the number of frequency band subsets may be determined according to a higher layer signaling from the network device. The size of each frequency band subset, or the number of frequency band subsets reflects the granularity of frequency-domain resource indication.

For the manner in which the frequency-domain indication information in the UL CI indicates one or multiple frequency band subsets, there may be several implementation manners as follows.

In a first implementation manner, the frequency band subsets are indicated by means of bitmap indication.

For example, the reference frequency-domain region is divided into M (M is a positive integer greater than 1) frequency band subsets. In this way, the indication information in the UL CI may be specifically a bitmap of M bits to indicate one or multiple frequency band subsets, namely target frequency-domain resources. When M=1, the UL CI may not include frequency-domain indication information (introduced hereinafter).

The M-bit bitmap herein may be used to indicate a single frequency band subset of the reference frequency-domain; or, it may be used to indicate a plurality of consecutive frequency band subsets of the reference frequency-domain; or, it may be used to indicate a plurality of non-consecutive frequency band subsets of the reference frequency-domain region.

The bitmap indication manner is convenient for configuration and flexible indication, and one or more frequency band subsets may be indicated flexibly.

In a second implementation manner, a single index is used to indicate frequency band subsets. For example, the reference frequency-domain region is divided into M (M is a positive integer greater than 1) frequency band subsets, and each frequency band subset is configured with an index. The indication information in the UL CI may be specifically used to indicate indexes of frequency band subsets. When M=1, the UL CI may not include frequency-domain indication information (introduced hereinafter).

This implementation manner may be used to indicate a single frequency band subset of the reference frequency-domain region. For each frequency band subset, the UL CI may include frequency-domain indication information with ceil(log$_2$ M) bits, and the formula ceil( ) means to obtain the smallest one of integers greater than or equal to a value in parentheses.

In a third implementation manner, frequency band subsets are indicated by an index and the number of consecutive frequency band subsets. For example, the reference frequency-domain region is divided into M (M is a positive integer greater than 1) frequency band subsets, and each frequency band subset is configured with an index. In this way, frequency-domain indication information in the UL CI may be specifically used to indicate an index of a starting frequency band subset in multiple consecutive frequency band subsets and the number of the multiple consecutive frequency band subsets. In this manner, the target frequency-domain resource is the foregoing multiple consecutive frequency band subsets.

In this implementation manner, the UL CI may include frequency-domain indication information with $$\text{ceil}\left(\log_2 \frac{M \times (M + 1)}{2}\right)$$

bits, which are respectively used to indicate the index of the starting frequency band subset in the multiple consecutive frequency band subsets and the number of the multiple consecutive frequency band subsets.

Since the data amount of the frequency-domain indication information is small by using the indication method of the third implementation manner, the signaling overhead can be saved.

Figure 14:
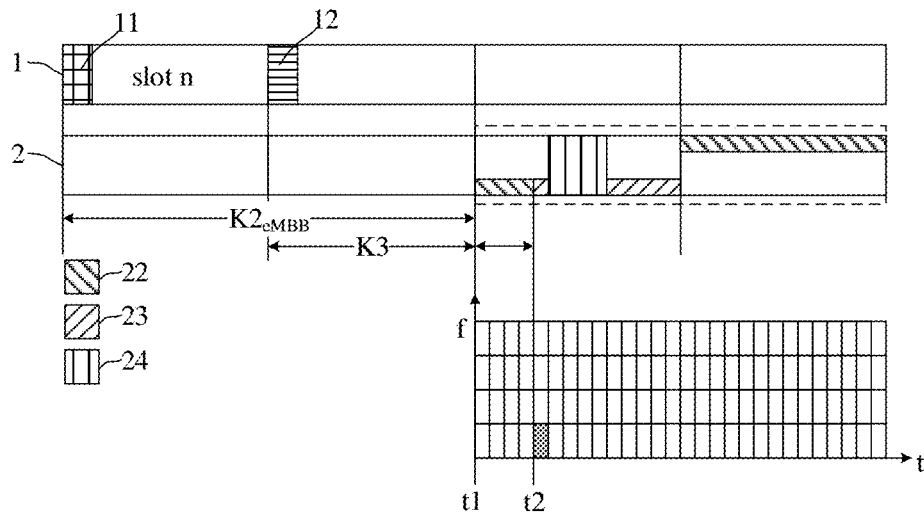
FIG. 14 is a schematic diagram of a method for canceling an uplink transmission according to an embodiment of the present application.

For example, as shown in FIG. 14, it is assumed that the UE receives UL CI in slot n (reference sign 12 in FIG. 14), the total time duration of the reference time region is 2 slots, and the UL CI indicates K3=1 slot, the UE determines a boundary of the first slot after K3 from slot n as the first starting time t1, and determines slot n+1 and slot n+2 as the reference time region, and the granularity of the sub-region indicated by the UL CI is 2 symbols. In addition, a resource of the reference frequency-domain region (Reference frequency region) is UL BWP, and the reference frequency-domain region is divided into 4 frequency band subsets. The UL CI uses 2 bits to indicate the specific frequency band subset where the uplink transmission is to be canceled as the target frequency-domain resource. In addition, the UL CI further indicates that the starting symbol where the uplink transmission is to be canceled is symbol 5 (the starting symbol is symbol 5), and the UL indicates that the target frequency-domain resource where the uplink transmission is to be canceled is the first frequency band subset; then the UE determines the frequency-domain resource where the uplink transmission is to be canceled is frequency-domain resources that overlaps the target frequency-domain resource from the fifth symbol of slot n+1 to the fourth symbol of slot n+2 (the filling pattern indicated by the reference number 23 in FIG. 14). In FIG. 14, t represents time and f represents frequency.

With the method for canceling an uplink transmission provided by the embodiments of the present disclosure, when a terminal device receives uplink transmission cancelation indication, the terminal device can determine a target time-frequency resource for canceling the uplink transmission, which improves the resource scheduling efficiency of a system.

Figure 15:
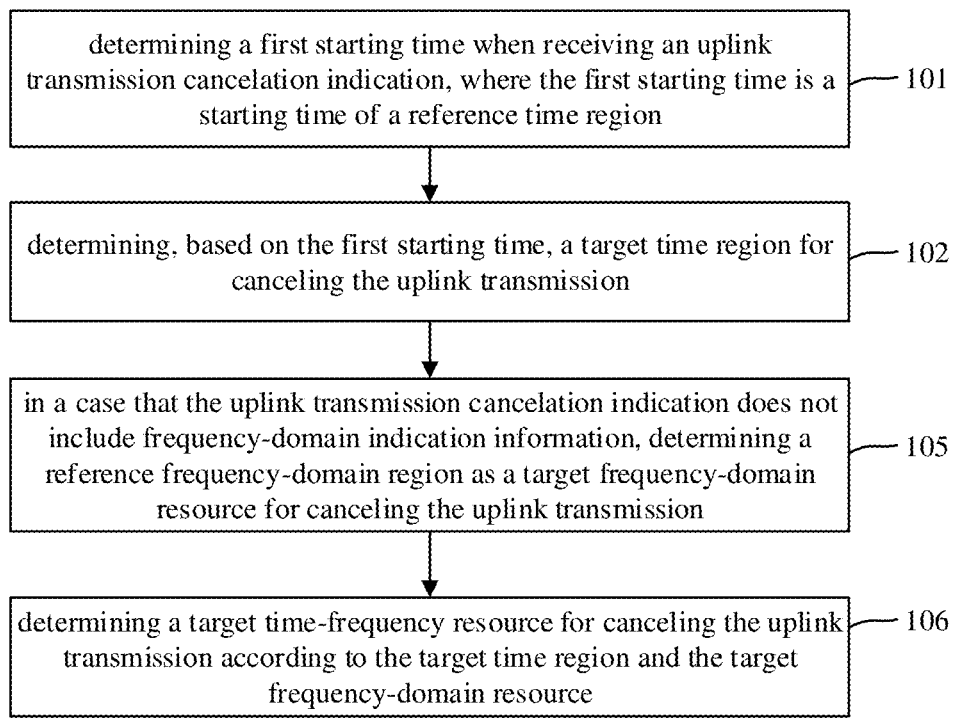
FIG. 15 is another schematic flowchart of a method for canceling an uplink transmission according to an embodiment of the present application.

Optionally, as shown in FIG. 15, the method for canceling an uplink transmission provided by any embodiment of the present disclosure may further include:

step 105: in a case that the uplink transmission cancelation indication does not include frequency-domain indication information, determining a reference frequency-domain region as a target frequency-domain resource for canceling the uplink transmission; and step 106: determining a target time-frequency resource for canceling the uplink transmission according to the target time region and the target frequency-domain resource, where the reference frequency-domain region is a frequency-domain bandwidth configured by a network device through a higher layer signaling, or the reference frequency-domain region is a frequency-domain bandwidth determined by a terminal device based on a protocol.

Specifically, the reference frequency-domain herein may be a currently activated uplink bandwidth part (BWP); it may also be part bandwidth of a currently activated uplink bandwidth part (BWP)

When receiving the uplink transmission cancelation indication, the terminal device may directly determine the reference frequency-domain region as the target frequency-domain resource for canceling the uplink transmission.

After the reference frequency-domain region is determined as the target frequency-domain resource for canceling the uplink transmission, the uplink transmission on the target frequency-domain resource may be suspended or canceled.

Similarly, based on the method for canceling an uplink transmission provided by the embodiments of the present disclosure, when receiving uplink transmission cancelation indication, a terminal device may determine a target time-frequency resource for canceling the uplink transmission, which improves the resource scheduling efficiency of a system.

The method for canceling an uplink transmission according to the embodiments of the present application has been described in detail above with reference to FIG. 1 to FIG. 15. A terminal device according to embodiment of the present application will be described in detail below with reference to FIG. 16 to FIG. 18.

Figure 16:
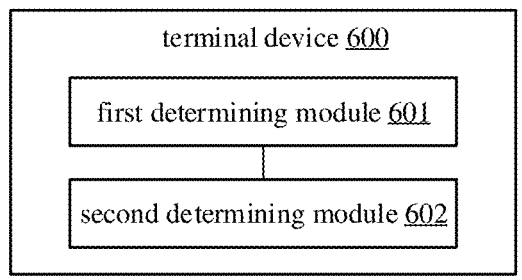
FIG. 16 is a schematic structural diagram of a terminal device 600 according to an embodiment of the present application.

FIG. 16 shows a schematic structural diagram of a terminal device provided by an embodiment of the present disclosure. As shown in FIG. 16, the terminal device 600 includes: a first determining module 601 and a second determining module 602.

The first determining module 601 is configured to determine a first starting time when receiving an uplink transmission cancelation indication, where the first starting time is a starting time of a reference time region.

Optionally, the first determining module 601 is specifically configured to determine the first starting time based on a reception time of the uplink transmission cancelation indication and a predetermined time interval.

Optionally, the terminal device 600 further includes a predetermined time interval determining module, configured to determine the predetermined time interval based on one of following manners: determining the predetermined time interval based on information included in the uplink transmission cancelation indication, where the information is used to indicate the predetermined time interval; determining the predetermined time interval based on a higher layer signaling used to configure the predetermined time interval; or determining the predetermined time interval based on a first preset value.

Optionally, the first preset value is a preset minimum cancelation time, and the predetermined time interval determination module is specifically configured to: determine the predetermined time interval according to a value of an uplink timing advance and the minimum cancelation time.

Optionally, the first determining module 601 is specifically configured to determine, as the first starting time, a first slot or a first symbol that is after the predetermined time interval from the reception time of the uplink transmission cancelation indication.

The second determining module 602 is configured to determine, based on the first starting time, a target time region for canceling the uplink transmission.

In a specific implementation manner, the terminal device 600 further includes a total time duration determining module, configured to determine a total time duration of the reference time region. Correspondingly, the second determining module 602 is specifically configured to determine the target time region based on the total time duration and the first starting time.

Optionally, the total time duration determining module is specifically configured to: determine the total time duration based on one of the following manners: determine the total time duration based on a higher layer signaling used to configure the total time duration; determine the total time duration based on a monitoring periodicity of the uplink transmission cancelation indication; or determine the total time duration based on a second preset value.

Optionally, the second determining module 602 is specifically configured to: determine, as the target time region, a time region with the total time duration and starting from the first starting time.

In another implementation manner, the uplink transmission cancelation indication includes target starting time information for indicating canceling a time-domain resource of the uplink transmission, and the terminal device 600 further includes a first time determining module, configured to determine a second starting time for canceling the uplink transmission based on the first starting time and the target starting time information. Correspondingly, the second determining module 602 is specifically configured to: determine an ending time of the reference time region based on the total time duration and the first starting time; and determine, as the target time region, a time region from the second starting time to the ending time.

In yet another implementation manner, the uplink transmission cancelation indication includes target starting time information and target time duration information that are for indicating canceling a time-domain resource of the uplink transmission, and the terminal device 600 further includes:

a second time determining module, configured to determine a second starting time for canceling the uplink transmission based on the first starting time and the target starting time information;

a target time duration determining module, configured to determine the target time duration for canceling the uplink transmission based on the target time duration information; and a target time region determining module, configured to determine, as the target time region, a time region with the target time duration and starting from the second starting time.

Optionally, the terminal device 600 provided by an embodiment of the present disclosure may further include: a first cancelation module, configured to suspend or cancel the uplink transmission in the target time region.

The terminal device provided by the embodiments of the present disclosure can determine a starting time of a reference time region when receiving an uplink transmission cancelation indication, determine a target time region based on the starting time of the reference time region, and then pause or cancel the uplink transmission in the target time region. Therefore, the terminal device can be made to determine a specific time-domain resource where the uplink transmission needs to be canceled, and resource scheduling efficiency of a system can be improved.

Optionally, the terminal device 600 provided by an embodiment of the present disclosure may further include a sub-region dividing module, configured to divide the reference time region into a plurality of sub-regions of a preset time duration based on a higher layer signaling for dividing the reference time region, so as to reduce the size of the bit-field in the UL CI, thereby saving transmission resources.

The preset time duration is greater than or equal to one symbol, the target starting time information is used to indicate canceling a start sub-region in sub-regions included in the time-domain resource for canceling the uplink transmission, and the target time duration information is used to indicate the number of the sub-regions included in the time-domain resource for canceling the uplink transmission.

Figure 17:
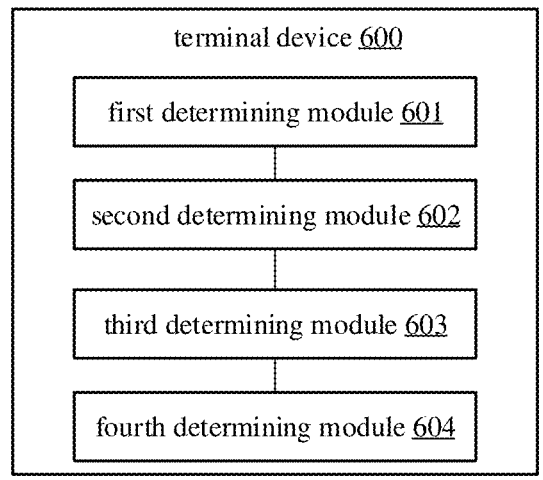
FIG. 17 is another schematic structural diagram of a terminal device 600 according to an embodiment of the present application.

Optionally, as shown in FIG. 17, a terminal device 600 provided by an embodiment of the present disclosure may further include:

a third determining module 603, configured to determine a target frequency-domain resource for canceling the uplink transmission according to frequency-domain indication information, in a case that the uplink transmission cancelation indication includes the frequency-domain indication information; and a fourth determining module 604, configured to determine, according to the target time region and the target frequency-domain resource, a target time-frequency resource for canceling the uplink transmission.

Optionally, the frequency-domain indication information is used to indicate one or multiple frequency band subsets of a reference frequency-domain region. The reference frequency-domain region is a frequency-domain bandwidth configured by a network device through a higher layer signaling, or the reference frequency-domain region is a frequency-domain bandwidth determined by the terminal device based on a protocol.

Optionally, the reference frequency-domain region includes a currently activated uplink bandwidth part (BWP).

Optionally, the frequency-domain indication information is used to indicate at least one of the following:

one frequency band subset of the reference frequency-domain region;

a starting frequency band subset in a plurality of consecutive frequency band subsets of the reference frequency-domain region and the number of the plurality of consecutive frequency band subsets; or a plurality of non-consecutive frequency band subsets of the reference frequency-domain region.

The terminal device provided by the embodiments of the present disclosure can determine a target time-frequency resource for canceling an uplink transmission when receiving uplink transmission cancelation indication, which improves the resource scheduling efficiency of a system.

Figure 18:
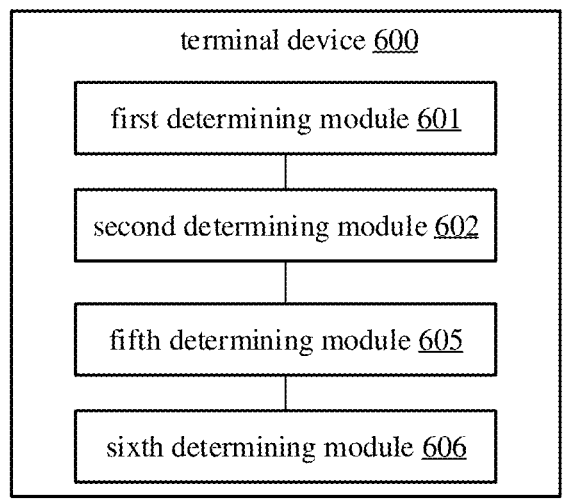
FIG. 18 is another schematic structural diagram of a terminal device 600 according to an embodiment of the present application.

Optionally, as shown in FIG. 18, a terminal device 600 provided by an embodiment of the present disclosure may further include:

a fifth determining module 605, configured to, in a case that the uplink transmission cancelation indication does not include frequency-domain indication information, determine a reference frequency-domain region as a target frequency-domain resource for canceling the uplink transmission; and a sixth determining module 606, configured to determine a target time-frequency resource for canceling the uplink transmission according to the target time region and the target frequency-domain resource, where the reference frequency-domain region is a frequency-domain bandwidth configured by a network device through a higher layer signaling, or the reference frequency-domain region is a frequency-domain bandwidth determined by a terminal device based on a protocol.

Optionally, the reference frequency-domain region includes a currently activated uplink bandwidth part (BWP).

The terminal device provided by the embodiments of the present disclosure can determine a target time-frequency resource for canceling an uplink transmission when receiving uplink transmission cancelation indication, which improves the resource scheduling efficiency of a system.

Optionally, on the basis of any one of the embodiments shown in FIG. 13 or FIG. 15, the terminal device 600 provided by an embodiment of the present disclosure may further include: a second canceling module, configured to suspend or cancel the uplink transmission on the target time-frequency resource.

The terminal device shown in FIG. 16 to FIG. 18 may be used to implement each embodiment about the method for canceling an uplink transmission shown in FIG. 1, FIG. 13, and FIG. 15. For related details, reference can be made to the above method embodiments.

Figure 19:
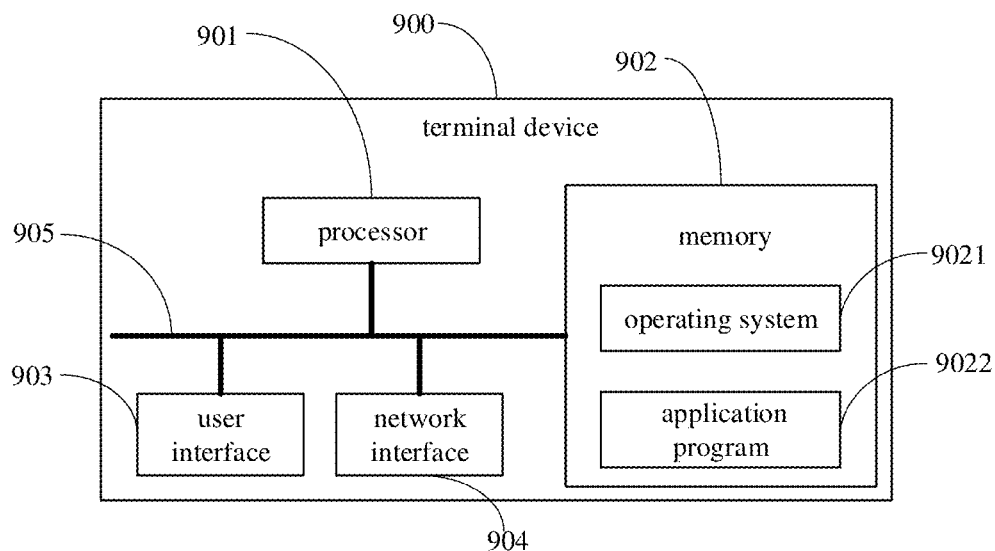
FIG. 19 is a schematic structural diagram of a terminal device 900 according to an embodiment of the present application.

FIG. 19 is a schematic structural diagram of a terminal device according to another embodiment of the present disclosure. The terminal device 900 shown in FIG. 19 includes: at least one processor 901, a memory 902, at least one network interface 904, and a user interface 903. Various components in the terminal device 900 are coupled together through the bus system 905. It may be understood that the bus system 905 is configured to implement connection and communication between these components. In addition to a data bus, the bus system 905 includes a power bus, a control bus, and a status signal bus. However, for the sake of clear description, various buses are marked as the bus system 905 in FIG. 19.

The user interface 903 may include a display, a keyboard or a pointing device (for example, a mouse, a trackball, a touch panel or a touch screen, etc.).

It can be understood that the memory 902 in embodiments of the present disclosure may be a volatile memory or a non-volatile memory, or may include both the volatile memory and the non-volatile memory. The non-volatile memory may be read-only memory (Read-Only Memory, ROM), programmable read-only memory (Programmable ROM, PROM), erasable programmable read-only memory (Erasable PROM, EPROM), or electrically erasable programmable read-only memory (Electrically EPROM, EEPROM) or flash memory. The volatile memory may be a random access memory (Random Access Memory, RAM), which is used as an external cache. By way of exemplary but not restrictive description, many forms of RAM are available, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchlink dynamic random access memory (Synchlink DRAM, SLDRAM) and direct Rambus random access memory (Direct Rambus RAM, DRRAM). The memory 902 in the system and the method described in some embodiments of the present disclosure is intended to include, but not limited to, these and any other suitable types of memory.

In some embodiments, the memory 902 stores the following elements, executable modules or data structures, or their subsets, or their extended sets: an operating system 9021 and an application program 9022.

The operating system 9021 includes various system programs, such as a framework layer, a core library layer, and a driver layer, which are used to implement various basic services and process hardware-based tasks. The application program 9022 includes various application programs, such as a media player (Media Player), a browser (Browser), which are used to implement various application services. A program for implementing the method according to embodiments of the present disclosure may be included in the application program 9022.

In embodiments of the present disclosure, the terminal device 900 further includes: a computer program stored in the memory 902 and executable on the processor 901. The computer program is executed by the processor 901 to implement various processes of the method for canceling an uplink transmission, and the same technical effects can be achieved, which is not repeated herein, so as to avoid repetition.

The method disclosed in the above embodiments of the present disclosure may be applied to the processor 901 or implemented by the processor 901. The processor 901 may be an integrated circuit chip with signal processing capability. In an implementation process, various steps of the foregoing method can be completed by a hardware integrated logic circuit in the processor 901 or by instructions in the form of software. The aforementioned processor 901 may be a general purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, a discrete gate or transistor logic device, or a discrete hardware component, which can implement or execute methods, steps, and logical block diagrams disclosed in embodiments of the present disclosure. The general-purpose processor may be a microprocessor or any conventional processor or the like. The steps of the method disclosed in some embodiments of the present disclosure may be directly embodied as being executed and completed by a hardware decoding processor, or executed and completed by a combination of hardware and software modules in the decoding processor. The software modules may be located in a computer-readable storage medium that is mature in the field, such as random access memory, flash memory, read-only memory, programmable read-only memory, electrically erasable programmable memory, or register. The computer-readable storage medium is located in the memory 902, and the processor 901 reads information from the memory 902, and completes the steps of the foregoing method in combination with its hardware. Specifically, a computer program is stored on the computer-readable storage medium, and when the computer program is executed by the processor 901, the processor 901 implements various steps of the foregoing embodiments about the method for canceling the uplink transmission.

It can be understood that the embodiments described in embodiments of the present disclosure may be implemented by hardware, software, firmware, middleware, microcode, or a combination thereof. For hardware implementation, the processing unit can be implemented in one or more of: application specific integrated circuit (Application Specific Integrated Circuit, ASIC), digital signal processor (Digital Signal Processor, DSP), DSP device (DSP Device, DSPD), programmable logic device (Programmable Logic Device, PLD), field programmable gate array (Field Programmable Gate Array, FPGA), general-purpose processor, controller, microcontroller, microprocessor, or other electronic units for performing the functions described in the present disclosure or a combination thereof.

For software implementation, the technology described in embodiments of the present disclosure can be implemented by executing functional modules (for example, procedures, functions, etc.) described in embodiments of the present disclosure. The software codes can be stored in the memory and executed by the processor. The memory can be implemented in the processor or external to the processor.

Embodiments of the present disclosure further provide a computer-readable storage medium, where a computer program is stored on the computer-readable storage medium. The computer program is executed by a processor to implement respective processes of the above method for canceling an uplink transmission, and the same technical effects can be achieved, which is not repeated herein, so as to avoid repetition. The computer-readable storage medium may be, for example, read-only memory (Read-Only Memory, ROM), random access memory (Random Access Memory, RAM), magnetic disk, or optical disk, etc.

Embodiments of the present disclosure further provide a computer program product including instructions. When executing the instructions of the computer program product, the computer executes the above method for canceling the uplink transmission. Specifically, the computer program product may be run on the aforementioned network device.

A person of ordinary skill in the art can be aware that units and algorithm steps of examples described in combination with the embodiments disclosed herein may be implemented by electronic hardware or a combination of computer software and electronic hardware. Whether these functions are executed by hardware or software depends on the specific application and design constraint conditions of a technical solution. A person of ordinary skill in the art may use different methods for respective specific applications to implement the described functions, but such implementations should not be considered beyond the scope of the present disclosure.

A person of ordinary skill in the art can clearly understand that, for the convenience and conciseness of description, for specific working processes of the above-described system, device, and unit, reference can be made to corresponding processes in the foregoing method embodiments, which will not be repeated herein.

In the several embodiments provided in the present disclosure, it should be understood that the disclosed system, device, and method may be implemented in other ways. For example, the device embodiments described above are only illustrative. For example, the division of the units is only a logical function division, and there may be other divisions in actual implementation, for example, multiple units or components may be combined or integrated into another system, or some features may be ignored or not implemented. In addition, the displayed or discussed mutual coupling or direct coupling or communication connection may be indirect coupling or communication connection through some interfaces, devices or units, and may be in electrical, mechanical or other forms.

Units described as separate components may or may not be physically separated, and components displayed as units may or may not physical units, that is, they may be located in one place, or they may be distributed on multiple network units. Some or all of the units may be selected according to actual needs to achieve the objective of a solution of an embodiment.

In addition, functional units in various embodiments of the present disclosure may be integrated into one processing unit, or respective units may exist alone physically, or two or more units may be integrated into one unit.

If the functions are implemented in a form of a software functional unit and sold or used as an independent product, the functions may be stored in a computer-readable storage medium. Based on such an understanding, essential part or the part contributing to the prior art of the technical solutions of the present disclosure, or a part of the technical solutions may be implemented in a form of a software product. The software product is stored in a storage medium, and includes several instructions for instructing a computer device (which may be a personal computer, a server, or a network device)

to perform all or a part of the steps of the methods described in the embodiments of the present disclosure. The foregoing storage medium includes any medium that can store a program code, such as a universal serial bus (USB) flash drive, a mobile hard disk, read-only memory (Read-Only Memory, ROM), random access memory (Random Access Memory, RAM), a magnetic disk, or an optical disc.

The above embodiments are only specific implementations of the present application, but the protection scope of the present application is not limited hereto. Any person skilled in the art can easily think of changes or substitutions within the technical scope disclosed in the present application, which shall fall within the protection scope of the present application. Therefore, the protection scope of the present application shall be subject to the protection scope of claims.

What is claimed is:

1. A method for canceling an uplink transmission, applied to a terminal device, comprising:
   determining a first starting time, when receiving an uplink transmission cancelation indication, wherein the first starting time is a starting time of a reference time region; and
   determining, based on the first starting time, a target time region for canceling the uplink transmission;
   wherein the method further comprises determining a total time duration of the reference time region,
   wherein the determining, based on the first starting time, the target time region for canceling the uplink transmission specifically comprises:
   determining the target time region based on the total time duration and the first starting time.

2. The method according to claim 1, wherein the determining the total time duration of the reference time region comprises: determining the total time duration based on one of following manners:
   determining the total time duration based on a higher layer signaling used to configure the total time duration;
   determining the total time duration based on a monitoring periodicity of the uplink transmission cancelation indication; or
   determining the total time duration based on a second preset value.

3. The method according to claim 1, wherein the determining the target time region based on the total time duration and the first starting time comprises:
   determining, as the target time region, a time region with the total time duration and starting from the first starting time.

4. The method according to claim 1, wherein the uplink transmission cancelation indication comprises target starting time information for indicating a time-domain resource for canceling the uplink transmission, and the method further comprises:
   determining a second starting time for canceling the uplink transmission based on the first starting time and the target starting time information, and
   wherein the determining the target time region based on the total time duration and the first starting time comprises:
   determining an ending time of the reference time region based on the total time duration and the first starting time; and
   determining, as the target time region, a time region from the second starting time to the ending time.

5. The method according to claim 1, wherein the uplink transmission cancelation indication comprises target starting time information and target time duration information that are for indicating a time-domain resource for canceling the uplink transmission, and the method further comprises:
   determining a second starting time for canceling the uplink transmission based on the first starting time and the target starting time information;
   determining a target time duration for canceling the uplink transmission based on the target time duration information; and
   determining, as the target time region, a time region with the target time duration and starting from the second starting time.

6. The method according to claim 5, further comprising:
   dividing the reference time region into a plurality of sub-regions of a preset time duration, based on a higher layer signaling for dividing the reference time region, wherein the preset time duration is greater than or equal to one symbol, the target starting time information is used to indicate a start sub-region in sub-regions comprised in the time-domain resource for canceling the uplink transmission, and the target time duration information is used to indicate the number of the sub-regions comprised in the time-domain resource for canceling the uplink transmission.

7. The method according to claim 1, further comprising:
   determining a target frequency-domain resource for canceling the uplink transmission according to frequency-domain indication information, in a case that the uplink transmission cancelation indication comprises the frequency-domain indication information; and
   determining, according to the target time region and the target frequency-domain resource, a target time-frequency resource for canceling the uplink transmission.

8. The method according to claim 7, wherein the frequency-domain indication information is used to indicate one or more frequency band subsets of a reference frequency-domain region, and
   wherein the reference frequency-domain region is a frequency-domain bandwidth configured by a network device through a higher layer signaling, or the reference frequency-domain region is a frequency-domain bandwidth determined by the terminal device based on a protocol.

9. The method according to claim 8, wherein the frequency-domain indication information is used to indicate at least one of following:
   one frequency band subset of the reference frequency-domain region;
   a starting frequency band subset in a plurality of consecutive frequency band subsets of the reference frequency-domain region, and the number of the plurality of consecutive frequency band subsets; or
   a plurality of non-consecutive frequency band subsets of the reference frequency-domain region.

10. The method according to any one of claim 1, further comprising:
    in a case that the uplink transmission cancelation indication does not comprise frequency-domain indication information, determining a reference frequency-domain region as a target frequency-domain resource for canceling the uplink transmission; and
    determining a target time-frequency resource for canceling the uplink transmission according to the target time region and the target frequency-domain resource, wherein the reference frequency-domain region is a frequency-domain bandwidth configured by a network device through a higher layer signaling, or the reference frequency-domain region is a frequency-domain bandwidth determined by the terminal device based on a protocol.

11. A non-transitory computer-readable medium, storing a wireless communication program, wherein the wireless communication program, when being executed by a processor, cause the processor to implement steps of the method according to claim 1.

12. A terminal device, comprising a memory, a processor, and a wireless communication program that is stored on the memory and executable on the processor,
   wherein when executing the wireless communication program, the processor is configured to:
   determine a first starting time, when receiving an uplink transmission cancelation indication, wherein the first starting time is a starting time of a reference time region; and
   determine, based on the first starting time, a target time region for canceling the uplink transmission;
   wherein the processor is further configured to:
   determine a total time duration of the reference time region, and
   determine the target time region based on the total time duration and the first starting time.

13. The terminal device according to claim 12, wherein the processor is further configured to determine the total time duration based on one of following manners:
   determining the total time duration based on a higher layer signaling used to configure the total time duration;
   determining the total time duration based on a monitoring periodicity of the uplink transmission cancelation indication; or
   determining the total time duration based on a second preset value, or
   wherein when determining the target time region based on the total time duration and the first starting time, the processor is further configured to:
   determine as the target time region, a time region with the total time duration and starting from the first starting time.

14. The terminal device according to claim 12, wherein the uplink transmission cancelation indication comprises target starting time information for indicating a time-domain resource for canceling the uplink transmission, and the processor is further configured to determine a second starting time for canceling the uplink transmission based on the first starting time and the target starting time information, and
   the processor is further configured to: determine an ending time of the reference time region based on the total time duration and the first starting time; and determine, as the target time region, a time region from the second starting time to the ending time;
   or
   wherein the uplink transmission cancelation indication comprises target starting time information and target time duration information that are for indicating a time-domain resource for canceling the uplink transmission, and the processor is further configured to:
   determine a second starting time for canceling the uplink transmission based on the first starting time and the target starting time information;

determine a target time duration for canceling the uplink transmission based on the target time duration information; and
determine, as the target time region, a time region with the target time duration and starting from the second starting time.

15. The terminal device according to claim 14, wherein the processor is further configured to:
   divide the reference time region into a plurality of sub-regions of a preset time duration, based on a higher layer signaling for dividing the reference time region,
   wherein the preset time duration is greater than or equal to one symbol, the target starting time information is used to indicate a start sub-region in sub-regions comprised in the time-domain resource for canceling the uplink transmission, and the target time duration information is used to indicate the number of the sub-regions comprised in the time-domain resource for canceling the uplink transmission.

16. The terminal device according to claim 12, wherein the processor is further configured to:
   determine a target frequency-domain resource for canceling the uplink transmission according to frequency-domain indication information, in a case that the uplink transmission cancelation indication comprises the frequency-domain indication information; and
   determine, according to the target time region and the target frequency-domain resource, a target time-frequency resource for canceling the uplink transmission.

17. The terminal device according to claim 16, wherein the frequency-domain indication information is used to indicate one or more frequency band subsets of a reference frequency-domain region, and
   wherein the reference frequency-domain region is a frequency-domain bandwidth configured by a network device through a higher layer signaling, or the reference frequency-domain region is a frequency-domain bandwidth determined by the terminal device based on a protocol.

18. The terminal device according to claim 17, wherein the reference frequency-domain region comprises a currently activated uplink bandwidth part (BWP).

19. The terminal device according to claim 17, wherein the frequency-domain indication information is used to indicate at least one of following:
   one frequency band subset of the reference frequency-domain region;
   a starting frequency band subset in a plurality of consecutive frequency band subsets of the reference frequency-domain region, and the number of the plurality of consecutive frequency band subsets; or
   a plurality of non-consecutive frequency band subsets of the reference frequency-domain region.

20. The terminal device according to claim 12, wherein the processor is further configured to:
   in a case that the uplink transmission cancelation indication does not comprise frequency-domain indication information, determine a reference frequency-domain region as a target frequency-domain resource for canceling the uplink transmission; and
   determine a target time-frequency resource for canceling the uplink transmission according to the target time region and the target frequency-domain resource,
   wherein the reference frequency-domain region is a frequency-domain bandwidth configured by a network device through a higher layer signaling, or the reference frequency-domain region is a frequency-domain bandwidth determined by the terminal device based on a protocol.

\* \* \* \* \*